United States Patent
Engelmann et al.

(10) Patent No.: US 7,135,995 B2
(45) Date of Patent: Nov. 14, 2006

(54) METHOD FOR AUTOMATIC DETERMINATION OF VALIDITY OR INVALIDITY OF INPUT FROM A KEYBOARD OR A KEYPAD

(75) Inventors: Harry Engelmann, Ingelheim (DE); Kurt Schaupert, Hofheim (DE)

(73) Assignee: Schott AG, Mainz (DE)

( * ) Notice: Subject to any disclaimer, the term of this patent is extended or adjusted under 35 U.S.C. 154(b) by 434 days.

(21) Appl. No.: 10/731,621

(22) Filed: Dec. 8, 2003

(65) Prior Publication Data

US 2004/0140913 A1 Jul. 22, 2004

(30) Foreign Application Priority Data

Dec. 6, 2002 (DE) .................................. 102 57 070

(51) Int. Cl.
  *H03M 11/00* (2006.01)
  *H03K 17/94* (2006.01)
(52) U.S. Cl. .......................... 341/22; 341/33; 400/477; 708/146
(58) Field of Classification Search .................. 341/22, 341/33; 400/477; 708/146
See application file for complete search history.

(56) References Cited

U.S. PATENT DOCUMENTS

| 3,786,497 A * | 1/1974 | Davis et al. ................... 341/24 |
| 4,771,268 A * | 9/1988 | Sone et al. ..................... 341/22 |
| 5,239,152 A | 8/1993 | Caldwell et al. |
| 5,334,976 A | 8/1994 | Wang |
| 5,594,222 A | 1/1997 | Caldwell |
| 5,861,588 A * | 1/1999 | Gillot .......................... 200/5 A |
| 5,973,621 A | 10/1999 | Levy |

FOREIGN PATENT DOCUMENTS

| EP | 1 191 430 | 3/1992 |
| EP | 0 768 598 | 4/1997 |
| EP | 1426854 A2 * | 6/2004 |
| GB | 2 022 264 | 12/1979 |
| GB | 1 573 409 | 8/1980 |
| GB | 2 263 183 A | 7/1993 |
| GB | 2 263 184 | 7/1993 |
| JP | 58085636 A | 5/1983 |
| JP | 2105913 | 4/1990 |
| WO | 02/42857 | 5/2002 |

\* cited by examiner

*Primary Examiner*—Timothy Edwards, Jr.
(74) *Attorney, Agent, or Firm*—Michael J. Striker

(57) ABSTRACT

The method for automatic determination of validity or invalidity of input from miniaturized keypads or keyboards, in which more than one key is operated at the same time, includes designating a number of keys as principal keys and assigning each key neighboring each principal key as nearest neighbor or next nearest neighbor and then testing each signal produced by key operation. The signal is valid if it is produced by operation of only one single key. However testing continues if two or more keys produce the signal. Then the signal is valid when the two or more keys are correlated in an unambiguous principal key-nearest neighbor key relationship. If not, testing continues further and the signal is valid if the plural keys are correlated in an unambiguous principal key-nearest neighbor key-next nearest neighbor key relationship. Otherwise the signal is an invalid key input.

5 Claims, 2 Drawing Sheets

METHOD FOR AUTOMATIC DETERMINATION OF VALIDITY OR INVALIDITY OF INPUT FROM A KEYBOARD OR A KEYPAD

BACKGROUND OF THE INVENTION

1. Field of the Invention

The present invention relates to a method for automatic determination of the validity or invalidity of input by keys arranged next to each other in a keypad or keyboard.

2. Description of the Related Art

Keypads, touch pads or keyboards are increasingly used to control various electronic units. These electronic units include computers, mobile phones, organizers, remote control panels and many other devices. They are designed ever smaller in connection with electronic unit miniaturization. A natural limit to miniaturization of a keyboard, touch screen or keypad comprising individual keys or touch sensors results from the size of the adult fingers, which are still able to operate the keyboard. The probability is very high with too small keys that two or more keys or touch sensors are operated at the same time instead of only one key, which leads to indefinite or unclear input.

This problem can be addressed by connecting the keys with an electronic controller, which shuts off the associated electronic unit when several keys or touch sensors are operated, pressed or contacted at the same time.

U.S. Pat. No. 5,973,621 describes a keypad comprising a plurality of adjacent key switches, arranged in a controllable flat pattern. The key switches are mechanical keys in the case of this patent. In order for an adult with large fingers to operate the miniaturized keyboard or keypad, key legends or characters are arranged in the intervening spaces between the keys, instead, as is common, on the individual keys. Particularly each key legend or character is associated with four or six adjacent keys, which together correspond to a fingertip area. This presupposes that the center of the fingertip area is applied at the intersection of the intervening spaces.

If necessary, additional key legends or characters can also be associated with individual keys. The keypad keys are then divided into two categories for evaluation of key inputs: keys, which are correlated with a single key legend or character, and other keys, which are only associated with an intervening space correlation. Only key inputs in which key switches or keys of one category or the other are pressed are determined to be valid In another type of analysis disclosed in U.S. Pat. No. 5,973,621 components of the signals originating from individual keys are differentiated according to intensity. Then the signal components are tested after ascertaining an intensity maximum for the signal component of one of the keys to determine whether sufficiently remote keys operated at the same time produce no signal component.

In GB 2 263 184 A it is proposed to arrange the keys so close to each other that usually more than one key is simultaneously operated. From the first how many and which auxiliary keys must be pressed with each main key is given. The electronics are designed so that each time whether all the associated auxiliary keys are operated with the main key is tested and, only if that is the case, is the appropriate key input correlated to operation of the main key. The electronics does not detect whether or not all associated auxiliary keys are operated together with the main key. However this case can occur especially when an operator with different sized fingers uses the keypad. For this case it is suggested that keypads with different dimensions should be provided.

SUMMARY OF THE INVENTION

It is an object of the present invention to provide a method for automatic determination of the validity or invalidity of key inputs by keys arranged next to each other in a keypad or keyboard.

According to the invention the method for automatic determination of the validity or invalidity of key inputs by keys next to each other in a keypad or keyboard comprises the steps of:

a) designating a plurality of the keys as principal keys and assigning each key neighboring each principal key as a nearest neighbor key or a next nearest neighbor key;

b) testing each signal produced by operation of the keys;

c) determining that the signal is a valid key input during testing if the signal is produced by operation of only one of the keys;

d) determining that the signal is a valid key input during the testing if the signal is produced by operation of at least two of the keys including one of the principal keys, and the at least two keys are correlated in an unambiguous principal key-nearest neighbor key relationship;

e) determining that the signal is a valid key input during the testing if the signal is produced by operation of the at least two keys and the at least two keys are correlated in an unambiguous principal key-nearest neighbor key-next nearest neighbor key relationship;

f) otherwise determining that the signal is an invalid key input during testing if the signal is not found to be a valid input signal during the determining of steps c), d) and e); and g) performing the determining of steps c), d) and e) one after the other until the signal is found to be valid and ending the testing of that signal as soon as it is found to be valid.

In preferred embodiments of the method each signal or signal component produced by one of the keys must exceed a predetermined threshold value prior to consideration during testing for validity of the signal.

In various embodiments of the method the keys of the keyboard are capacitive or field effect contact or touch sensor switches. In a preferred embodiment the keys are field effect touch sensors, which produce an analog signal, which increases synchronously with the field produced by the operating object.

Because of the method according to the invention in spite of the miniaturization of a keypad or keyboard each key can be exactly correlated with a single function. This not only improves the operability, but also costs, since the number of keys is not increased beyond the number of key functions.

First each key acting as principal key is assigned keys immediately next to it as nearest neighbor keys. Those keys, which are nearest neighbors of a key are the keys in the area around the key, for which respective probabilities that they will be operated at the same time as the principal key are greatest. Thus to establish an unambiguous principal key-nearest neighbor key relationship it is not necessary for the keys of the keypad or keyboard to be arranged in a particular pattern. The extent to which a key is spaced from a principal key is a measure of the probability of operating it during an intended operation of the principal key.

When one or more keys are operated to produce a signal, various testing steps must be performed. In the simplest case only one key produces the signal. Then the key input for this key is understandably valid.

More generally several keys produce a signal simultaneously. In this case whether the combination of the keys, which produces the signal jointly, can be correlated in or assigned to one of the established principal key-nearest neighbor key relationships must be tested. If this assignment or correlation is possible, then the key input for the principal key of the corresponding relationship is valid.

In order to reduce the number of cases treated as invalid key inputs, each key, acting as principal key, is additionally assigned adjacent keys identified as next nearest neighbor keys. Those keys, which are designated as next nearest neighbors of a key are the keys in the area around the key, for which respective probabilities that they will be operated at the same time as the key, while less than the corresponding probabilities for the nearest neighbor keys, are still not insignificant, when someone with a large size finger does not exactly press the desired principal key. When the measure of the probability of joint operation of keys is their key separation, the next nearest neighbor keys are further from the principal key than the nearest neighbor keys, but still are closer than the remaining keys.

With signals, which are produced simultaneously by several keys, then testing proceeds not only according to an appropriate principal key-nearest neighbor key relationship, but also according to an unambiguous principal key-nearest neighbor-next nearest neighbor relationship. The key input is valid again when a principal key is an unambiguously established by the testing. This embodiment of the method is especially applicable for comparatively small keys, with which even more keys are simultaneously operated.

It makes sense to consider further removed keys in relation to the principle key according to the size and arrangement of the keys.

Each signal produced by the keys or parts of the signal produced by them—in the case of operating signals produced by several keys simultaneously—is required to exceed a threshold value, before it will be considered during the testing for validity of the key input. Only signals with predetermined minimum intensities are to be considered during the testing. Signals, which are activated by an unintentional only light contacting, will then be discarded at the outset of the testing.

In a preferred embodiment of the method the method is performed in a keypad or touch pad comprising capacitive touch sensor switches. In a capacitive touch sensor switch a substrate is provided with a conductive layer. Usually a glass substrate is provided with an indium-tin oxide layer (ITO). The conductive layer is connected with four electrodes, arranged in two pairs of electrodes opposite from each other. Both pairs are arranged at a definite angle to each other. Each electrode is connected to an oscillator circuit. When a finger contacts the substrate, the capacitance of the contacting body changes the impedance of the capacitive contact or touch sensor switch. This impedance change causes a frequency change of the oscillator. These frequency changes can be converted into x-y coordinates by means of an analog-digital converter.

In an additional preferred embodiment the method according to the invention is performed in a keypad or touch pad comprising field effect touch sensor switches.

Field effect touch sensor switches are described in U.S. Pat. No. 5,594,222.

The field effect touch sensor switch is based on a first flat electrode and a second electrode, which is arranged coplanar to the first plane electrode and around it. The electrodes are of opposite polarity. An electromagnetic field symmetrical to the electrode plane arises between both electrodes, which are perturbed by placing a finger on one side of the electrode plane. This leads to a signal that the touch sensor switch has been operated.

In the case of field effect-touch sensor switches it is advantageous when each touch sensor switch produces an analog signal, which synchronously increases with the influence of the operating object, e.g. a finger, on the field.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
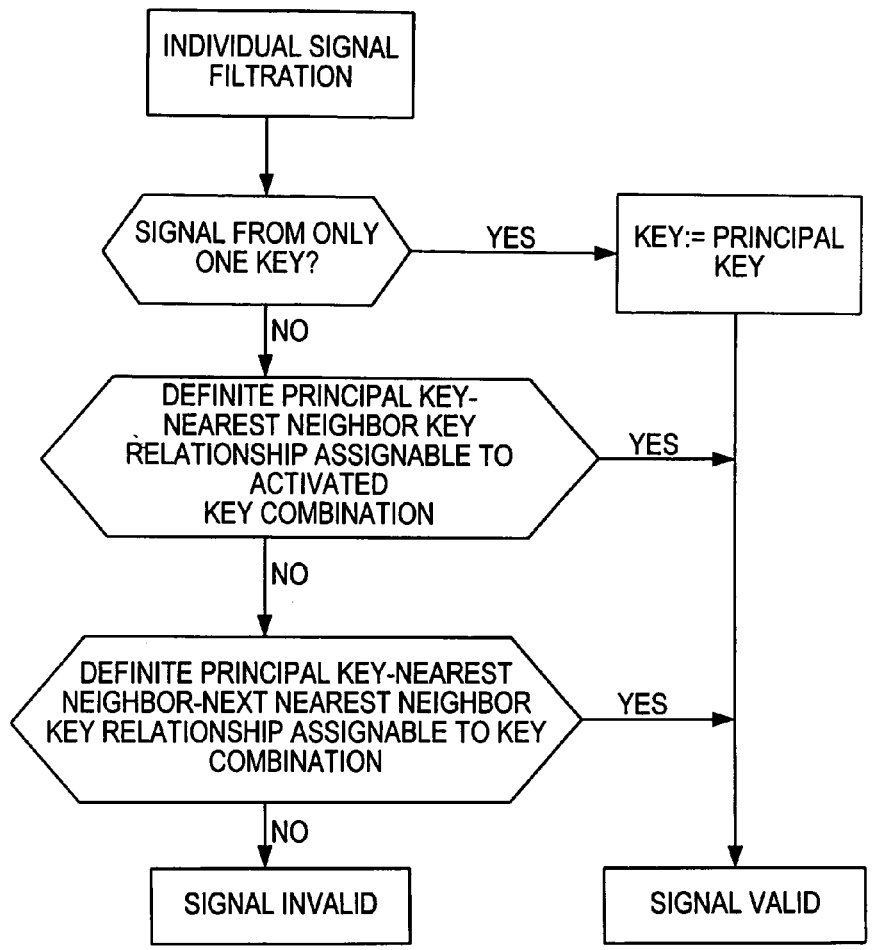
FIG. 1 is a flow chart of a preferred embodiment of the method according to the invention for automatic determination of validity or invalidity of key input from a keypad or keyboard.

According to the example shown in FIG. 1 the method first comprises discriminating all signals occurring at the same time. These signals must have a minimum intensity, in order to be considered. In the next step whether or not the signal is due to operation of only a single key switch is tested. If that is the situation, i.e. "yes", then this key switch is considered the principal key switch.

If the signal, on the other hand, comprises a plurality of individual key signals or signal components due to operation of different keys at the same time, whether or not this combined signal, and/or the activated key combination producing it, can be correlated with an unambiguous or well-defined principal key-nearest neighbor key relationship is tested. If the answer to this test is "yes", then the principal key is unambiguously established and operation of this principal key is valid.

If no well-defined or unambigous principal key-nearest neighbor relationship is established during the previous testing, whether or not combined signal and/or the activated key combination producing it can be correlated with an unambiguous principal key-nearest neighbor-next nearest neighbor relationship is tested. If that is the situation, the principal key is established or determined and the operation of this principal key, or the combined signal, is valid. If that is not the case, then the operation of the keys is invalid.

Figures 2A, 2B, 2C:
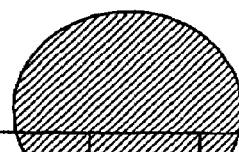
FIGS. 2a to 2c, respectively, are different diagrammatic plan views showing different key inputs for a particular keypad or keyboard.

In FIGS. 2a to 2c a keypad or keyboard comprising 16 keys is shown. The shaded area in these figures represents the pressing surface area of a finger on the keypad surface. The finger is comparatively large in comparison to the moderately small dimensioned keypad. Thus several keys are operated at the same time when the finger contacts the keypad.

In the present keypad or keyboard each key is associated with between two and four nearest neighbors. This keypad or keyboard is such that the nearest neighbor keys have an edge in common with the principal key (the definition of nearest neighbor). The number of nearest neighbors depends on the position of the principal key in the keypad or keyboard. For example, the key 1, acting as a principal key, is correlated to the keys 2 and 5 as nearest neighbors. The key 10, acting as a principal key, is correlated to the keys 6, 9, 11 and 14, each being a nearest neighbor key.

Furthermore each key acting as a principal key is associated with one to four next nearest neighbors. This keypad or keyboard is such that the next nearest neighbor keys have a corner in common with the principal key (the definition of next nearest neighbor). In the case that key 1 is the principal key, the key 6 is its only next nearest neighbor. In the case of key 10 as principal key the keys 5, 7, 13 and 15 are its next nearest neighbor keys.

When the key input signal according to FIG. 2a is tested, it is established that keys 6, 7, 8, 10, 11, 12, 14 and 15 have responded. Thus the test shows that not only one key has been operated, but several keys were operated. Because of that the combined signal is tested to determine if it is correlated with an unambiguous principal key-nearest neighbor key relationship (a single principal key is apparent). Four keys, each acting as a principal key, would each have two nearest neighbor keys respectively and five keys, namely 6, 8, 12, 14 and 15.

Two keys, each acting as a principal key, would have three nearest neighbor keys, namely the keys 7 and 10. The key 11 acting as principal key would have four nearest neighbors and three keys, Thus there is no unambiguous principal key-nearest neighbor key relationship assignable to the key combination represented in FIG. 2a, with which all key signals can be correlated.

Thus in a next step the method proceeds to test whether or not there is an unambiguous principal key-nearest neighbor key-next nearest neighbor key relationship. In this case the principal key 11 has an unambiguous principal key-nearest neighbor key-next nearest neighbor key relationship since it has four nearest neighbors 7, 10, 12, 15 and three next nearest neighbors 6, 8 and 14. Thus the key 11 is determined to be the principal key and the operation of the principal key 11 is valid.

The method also leads to a result when a key at the edge of the keypad or keyboard is contacted, as shown in FIG. 2b. The signals from keys 2, 3 and 4 are sufficiently strong to be considered. Since it is not a matter of the signal from only one key switch, the signal is tested for a principal key-nearest neighbor key relationship. One finds that such a relationship exists with key 3 as the principal key and keys 2 and 4 as the nearest neighbor keys.

In operating according to FIG. 2c the signals of keys 1 and 2 are not considered since they are too weak. The remaining signals from keys 5, 6, 7, 9, 10 and 11 may be considered. The testing for an unambiguous well-defined principal key-nearest neighbor key does not have a positive result. Also the testing for a well-defined principal key-nearest neighbor key-next nearest neighbor key relationship does not have a clearly definite and unambiguous result. Two equivalent relationships are present, namely with either key 6 or key 10 as the principal. Thus operation of this group of keys does not result in a valid key signal.

The disclosure in German Patent Application 102 57 070.1-53 of Dec. 6, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for automatic determination of validity or invalidity of input by keys of a keyboard or key pad or touch sensors of a touch pad, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for automatic determination of validity or invalidity of key inputs made by operation of keys arranged next to each other in a keypad or keyboard, said method comprising the steps of:
   a) designating a plurality of the keys as principal keys and assigning each key neighboring each principal key as a nearest neighbor key or a next nearest neighbor key;
   b) testing each signal produced by operation of said keys;
   c) determining that the signal is valid during said testing of step b) if the signal is produced by operation of only one of the keys;
   d) determining that said signal is valid during said testing of step b) if said signal is produced by operation of at least two of the keys including one of the principal keys, and if said at least two keys are correlated in an unambiguous principal key-nearest neighbor key relationship;
   e) determining that said signal is valid during said testing of step b) if said signal is produced by operation of said at least two keys including one of the principal keys, and if said at least two keys are correlated in an unambiguous principal key-nearest neighbor key-next nearest neighbor key relationship;
   f) otherwise determining that said signal is invalid during said testing of step b) if said signal is not found to be valid during the determining of steps c), d) and e);
   g) performing the determining of steps c), d), e) and f) one after the other until said signal is found to be valid or not and ending said testing as soon as said signal is found to be valid.

2. The method as defined in claim 1, wherein said signal or each signal part produced by each key must exceed a respective predetermined threshold value prior to consideration during said testing for validity of said signal.

3. The method as defined in claim 1, wherein said keys are capacitive touch sensor switches.

4. The method as defined in claim 1, wherein said keys are field effect touch sensor switches.

5. The method as defined in claim 1, wherein said keys are field effect touch sensor switches that produce an analog signal and said analog signal increases synchronously with increasing influence of an operating object on a field of said field effect touch sensor switches.

* * * * *